United States Patent

Ishimaru

[11] Patent Number: 6,141,122
[45] Date of Patent: Oct. 31, 2000

[54] DATA COMPRESSING METHOD, IMAGE DATA MEMORY, AND METHOD AND DEVICE FOR EXPANDING COMPRESSED DATA

[75] Inventor: Kenji Ishimaru, Tokyo, Japan

[73] Assignee: Sega Enterprises, Ltd., Tokyo, Japan

[21] Appl. No.: 08/492,088

[22] PCT Filed: Nov. 18, 1994

[86] PCT No.: PCT/JP94/01957

§ 371 Date: Mar. 12, 1996

§ 102(e) Date: Mar. 12, 1996

[87] PCT Pub. No.: WO95/14295

PCT Pub. Date: May 26, 1995

[30] Foreign Application Priority Data

Nov. 18, 1993 [JP] Japan .................................. 5-289272

[51] Int. Cl.[7] .............................. H04N 1/411; H04N 1/46; G06K 9/36
[52] U.S. Cl. ................... 358/539; 358/261.2; 358/261.4; 358/426; 358/448; 358/460; 358/524; 358/500; 382/162; 382/165; 340/63; 340/64; 340/95; 345/153; 345/154; 375/253
[58] Field of Search ............................ 358/261.4, 261.1, 358/426, 448, 460, 451, 515, 523, 524, 539, 521, 500, 461; 382/162, 299, 165, 238, 239, 245, 168, 171, 172; 341/63, 64, 95; 345/153, 154, 155, 186, 188, 199, 202; 375/253

[56] References Cited

U.S. PATENT DOCUMENTS 4,823,201  4/1989  Simon ...................................... 358/539
5,140,412  8/1992  Shishida et al. ......................... 358/539
5,305,111  4/1994  Chao et al. ........................... 358/262.1
5,365,252  11/1994  Lo .......................................... 345/153
5,374,957  12/1994  Sharma .................................. 358/539
5,539,401  7/1996  Kumaki et al. ........................... 341/67
5,615,281  3/1997  Yamaguchi ............................. 382/162

FOREIGN PATENT DOCUMENTS 0 339 948  11/1989  European Pat. Off. .
0 343 790  11/1989  European Pat. Off. .
53-87121  8/1978  Japan .
55-21603  2/1980  Japan .
59-135975  8/1984  Japan .

*Primary Examiner*—Edward L. Coles
*Assistant Examiner*—Mark Wallerson
*Attorney, Agent, or Firm*—Dickstein Shapiro Morin & Oshinsky LLP

[57] ABSTRACT

A data compressing method which can efficiently compress image data containing color data is provided. A compressed data expanding method which can expand the compressed data at high speed is provided. Image data containing color data are compressed into image data including: address fields code A, code B, code C which hold addresses of color RAMs storing color information corresponding to the color data; classification fields which, when the color RAMs are classified into prescribed categories A, B, C, hold classification information of the categories including the color data; and run length fields RL which hold numbers of successive repetitions of color data. To expand the compressed image data, the classification fields are decoded to determine the categories in which the color data are included. Based on the determined categories, the first processing for decoding the address fields to generate addresses, and the second processing for supplying the generated addresses by the numbers of successively repeated color data in the run length fields to access the color RAMs are performed.

11 Claims, 11 Drawing Sheets

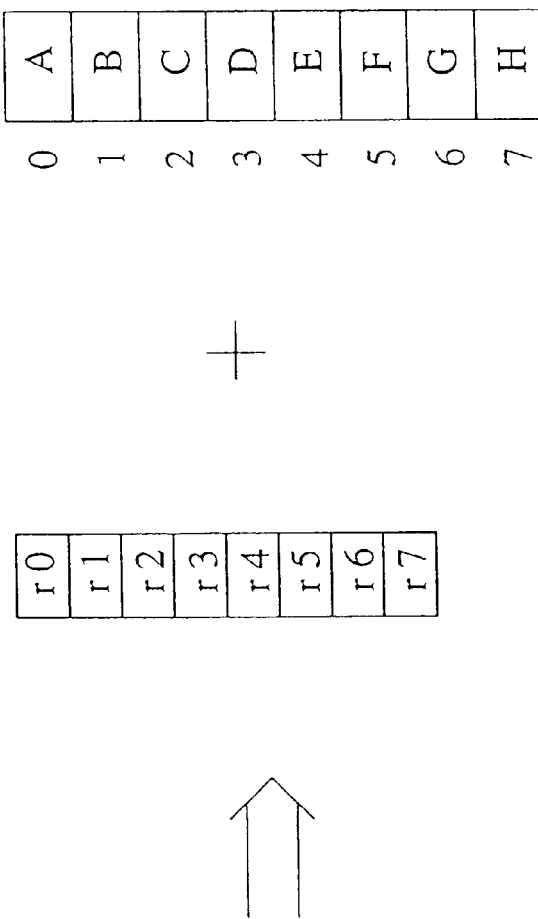

| 0 | 1 | 2 | 3 |
| 4 | 5 | 6 | 7 |
| 8 | 9 | 10 | 11 |

| | |
|---|---|
| P1 | Color Number |
| P2 | Object Address |
| P3 | OT \| RF \| VF \| RF |
| P4 | V-Cell \| H-Cell |
| P5 | V-Zoom Center \| H-Zoom Center |
| P6 | V-Zoom Ratio \| H-Zoom Ratio |
| P7 | Disp. V-Pos. \| Disp. H-Pos. |
| P8 | ... |
| ⋮ | ... |
| | ... |
| | ... |

FIG. 10

| SELECTION | COLOR RAM ADDRESS cad0 | COLOR RAM ADDRESS cad1 |
|---|---|---|
| 1 | ADDRESS DATA dad1 GENERATED BASED ON IMMEDIATELY PRECEDING COMPRESSED DATA (OUTPUT L2 OF 3RD LATCH 36) | ADDRESS DATA dad0 (OUTPUT L0 OF 2ND LATCH 35) |
| 2 | ADDRESS DATA dad0 (OUTPUT L0 OF 2ND LATCH 35) | ADDRESS DATA dad0 (OUTPUT L0 OF 2ND LATCH 35) |
| 3 | ADDRESS DATA dad0 (OUTPUT L0 OF 2ND LATCH 35) | ADDRESS DATA dad1 (OUTPUT L1 OF 2ND LATCH 35) |
| 4 | ADDRESS DATA dad1 (OUTPUT L1 OF 2ND LATCH 35) | ADDRESS DATA dad1 (OUTPUT L1 OF 2ND LATCH 35) |

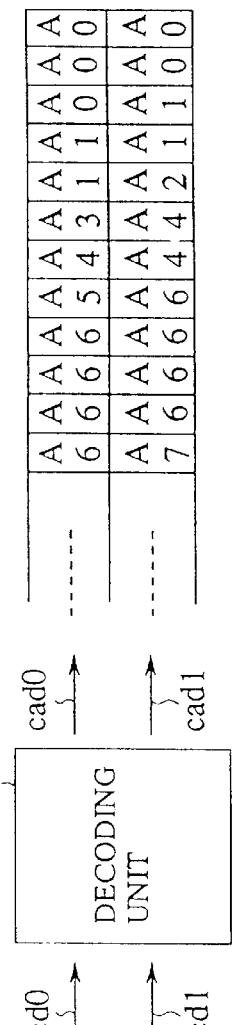
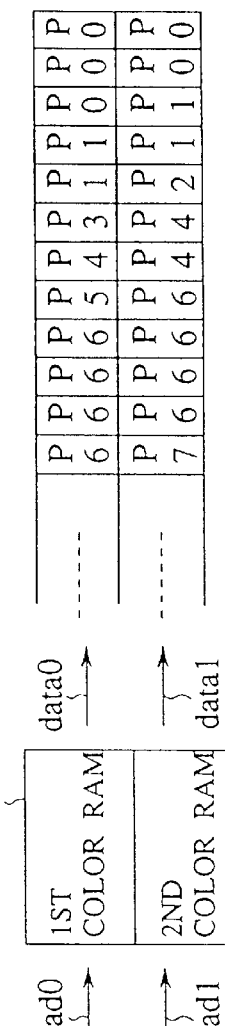
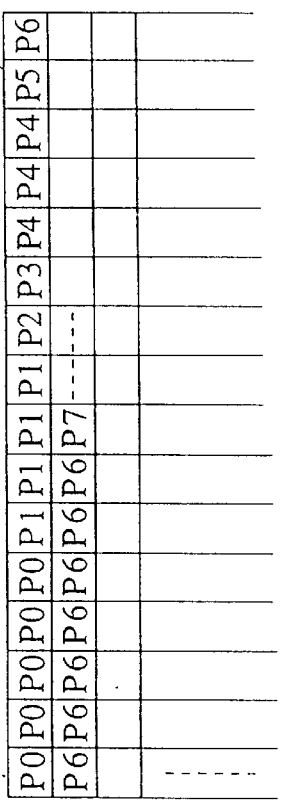
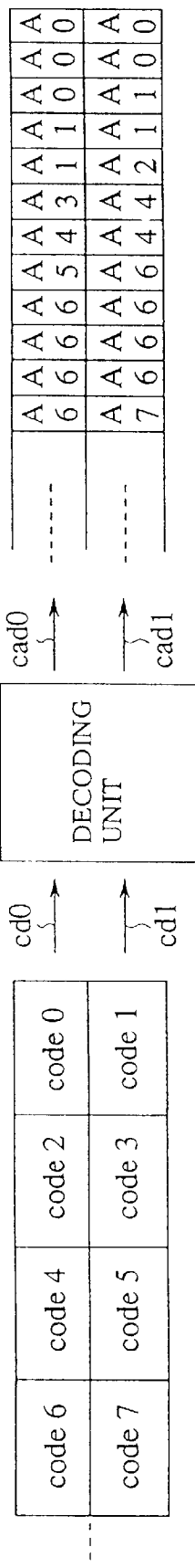
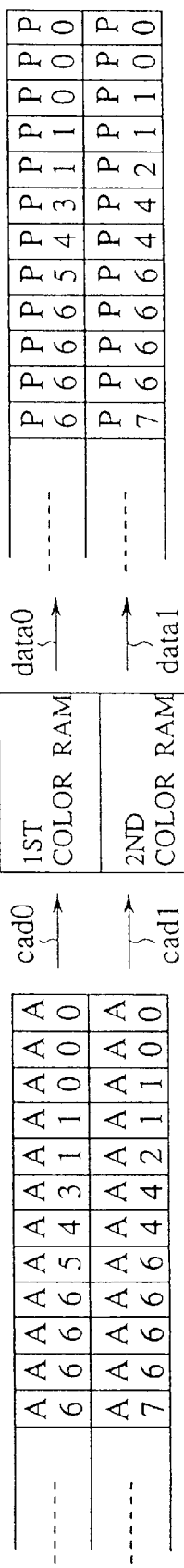
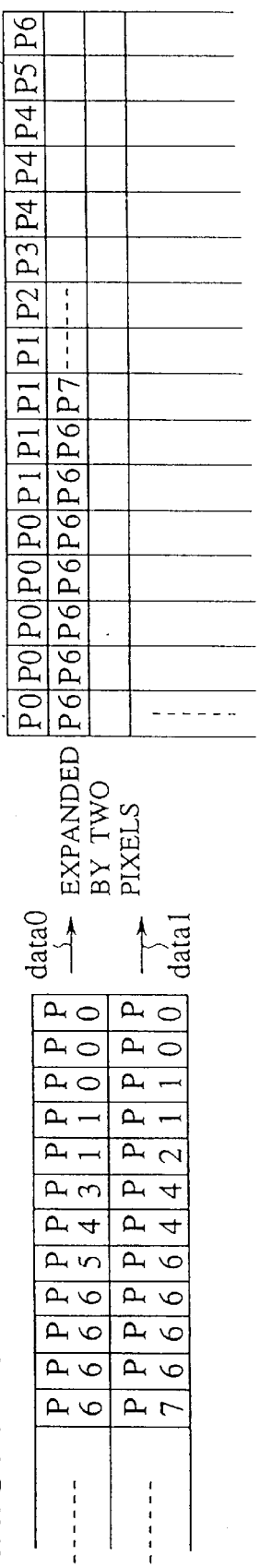
FIG. 11A
FIG. 11B
FIG. 11C

A~H : RGB DATA

0~7 : ADDRESS VALUES OF COLOR RAM

DATA COMPRESSING METHOD, IMAGE DATA MEMORY, AND METHOD AND DEVICE FOR EXPANDING COMPRESSED DATA

TECHNICAL FIELD

The present invention relates to a data compressing method for compressing image data containing color data, an image data memory for storing the compressed image data, a method and a device for expanding the image data.

BACKGROUND ART

The conventional image data processing equipment comprises a color RAM which holds a number of color information to be used, and an object data memory which holds object data which holds address information of the color RAM.

FIGS. 12A to 12C show memory maps of the object data memory and the color RAM of the conventional image data processing equipment. The maps comprise a bitmap of 8 successive pixels for respective colors A–H as shown in FIG. 12A, a color RAM which holds RGB data of the colors A–H (FIG. 12C), and an object data memory which holds address information (0–7) of the color RAM (FIG. 12B).

The color RAM of FIG. 12C is accessed based on addresses held by the object data memory of FIG. 12B to output color information of the object data held by the object data memory.

Such conventional image data processing equipment needs, as the object data memory, a large capacity memory having capacities for a number of pixels on the bitmaps. This hinders downsizing of the equipment and cost reduction. This is a problem.

An object of the present invention is to provide a data compressing method which can efficiently compress image data containing color data.

Another object of the present invention is to provide an image data memory which can efficiently compress image data containing color data and store the compressed image data.

A further another object of the present invention is to provide a compressed data expanding method and system which can quickly expand compressed data on a bitmap.

DISCLOSURE OF INVENTION

The image data compressing method according to one aspect of the present invention is characterized in that image data containing color date are compressed into image data including: address fields which hold addresses of color information storage means holding color information, the address corresponding to the color data; classification fields which, when the color information storage means are classified in prescribed categories, hold classification information of the category in which the color data are included; and run length fields which hold numbers of successive repetitions of color data. Image data containing color data can be efficiently compressed.

In the above-described image data compressing method, it is preferable that, when the address fields have a large bit number, the run length fields have a decreased bit number, so that the image data have a fixed length. Compressed image data can be stored in the memory efficiently and compactly.

In the above-described image data compressing method, it is preferable that the categories in which the color information storage means are classified are determined in accordance with frequencies of use of the color information. Color data with a high frequency of use can be compressed, so that an overall higher data compression ratio can be obtained.

In the above-described image data compressing method, it is preferable that the image data further includes cell fields which indicate whether or not all pixels of a cell which is a processing unit for writing have the same color. Image data containing color data can be more efficiently compressed.

The image data memory according to one aspect of the present invention is characterized in that the image data memory comprises: address regions which hold addresses of color information storage means holding color information, the address corresponding to the color data; classification regions which, when the color information storage means are classified in prescribed categories, hold classification information of the categories in which the color data is included; and run length regions which hold numbers of successive repetitions of color data. Image data containing color data can be efficiently compressed to be stored.

In the above-described image data memory, it is preferable that a total of a bit number of the address regions and a bit number of the run length regions is a prescribed bit number so that the image data has a fixed length. Compressed image data can be stored in the memory efficiently and compactly.

In the above-described image data memory, it is preferable that the image data memory further comprises cell regions which indicate whether or not all pixels of a cell which is a processing unit for writing have the same color. Image data containing color data can be efficiently compressed to be stored.

The image data memory according to another aspect of the present invention is characterized in that the image data memory comprises: address fields which hold addresses of color information storage means holding color information; category regions which, when the color information storage means are classified in prescribed categories, hold classification information of the categories in which the color data are included; and run length regions which hold numbers of successive repetitions of color data.

The method for expanding compressed data according to one aspect of the present invention is characterized in that the method comprising: a first processing of decoding the classification fields to determine categories in which the color data are included, and, based on the determined categories. decoding the address fields to generate addresses; and a second processing of repeatedly supplying the generated addresses by the numbers of successive repetitions of color data in the run length fields. Compressed data can be expanded in a bitmap at high speed.

In the above-described method for expanding compressed data, it is preferable that the first processing and the second processing are performed in parallel as individual stages to be pipeline controlled. Compressed data can be quickly expanded.

The device for expanding compressed data according to one aspect of the present invention is characterized in that the device comprises: decoding means which decodes the classification fields to determine categories in which the color data are included, and, based on the determined categories, decodes the address fields to generate addresses; and address supply means which repeatedly supplies the addresses generated by the decoding means by the numbers of successive repetition of the color data in the run length fields to access the color information storage means. Compressed data can be quickly expanded in a bitmap.

In the above-described device for expanding compressed data, it is preferable that two or more sets of the color information storage means, the decoding means and the address supplying means are provided, and that the first processing by the decoding means, and the second processing by the address supply means are performed in parallel as individual stages to be pipeline controlled. Compressed data can be more quickly expanded.

The image data processing device according to another aspect to the present invention is characterized in that the image data processing device comprises: color information storage means which classify color information in prescribed categories and hold the same; an image data memory including address regions which hold addresses of the color information storage means corresponding to the color data, classification information regions which hold category information of the color information storage means including the color data, and run length regions which hold numbers of successive repetitions of color data, the image data containing the color data being stored compressed; decoding means which decodes the classification fields to determine the categories in which the color data are included, and, based on the determined categories, decodes the address fields to generate addresses; address supply means which repeatedly supplies the generated addresses by the decoding means by the numbers of successive repetitions of color data in the run length fields to access the color information storage means; storage means which sequentially stores the image data containing the color data read from the color information storage means by the address supply means; and display means which displays the expanded image data by the storage means. Compressed image data can be stored in the memory efficiently and compactly, compressed image data can be quickly expanded in a bitmap, and the image data can be displayed quickly.

BRIEF DESCRIPTION OF THE DRAWINGS

FIG. 2A to 2C are views explaining the data compressing method according to one embodiment of the present invention, FIG. 2A being a bitmap of object data, FIG. 2B being a memory map of an object data memory, and FIG. 2C being a memory map of the color RAM.

FIG. 10 is a view of combinations of address data selected by the selector in FIG. 8.

FIGS. 11A to 11C are views explaining an example of image data expansion processing according to one embodiment of the present invention, FIG. 11A being a view explaining output-input relationships of the decoding unit, FIG. 11B being a view explaining input-output relationships of the color RAM, FIG. 11C being a view explaining expansion in a bitmap in the cell buffer.

BEST MODE FOR CARRYING OUT THE INVENTION

The data compressing method according to one embodiment of the present invention will be explained with reference to FIGS. 1 and 2.

A data format of image data to be used in the data compressing method according to the present embodiment will be explained with reference to FIGS. 1A to 1D.

Figure 1B:
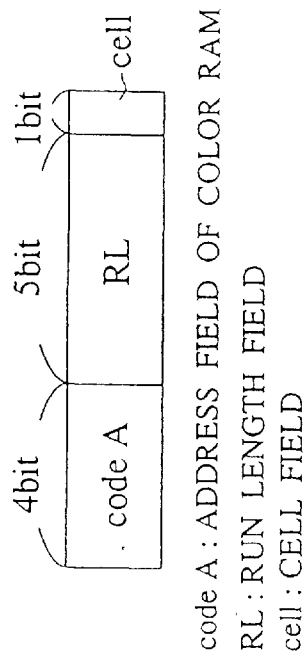
FIGS. 1A to 1D are views explaining the image data compressing method according to one embodiment of the present invention, FIG. 1A being a memory map of a color RAM (color information storage means) which holds color information, FIG. 1B being a data format of data for access to a Region A of the color RAM, FIG 1C being a data format of data for access to Region B of the color RAM, and FIG. 1D being a data format of data for access to Region C of the color RAM.
Figure 1C:
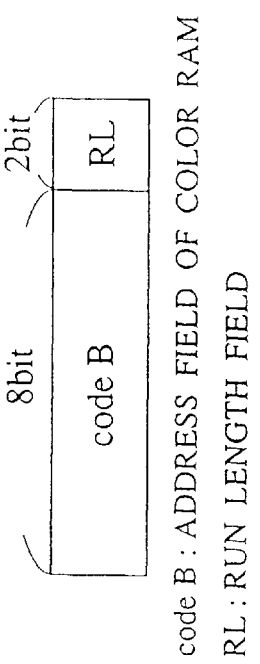
Figure 1D:
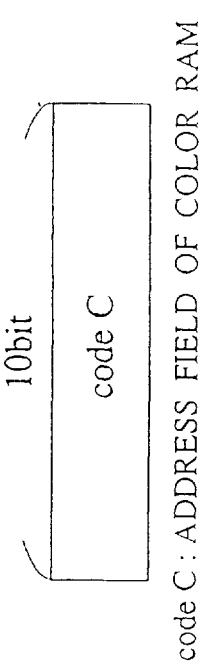
Figure 1A:
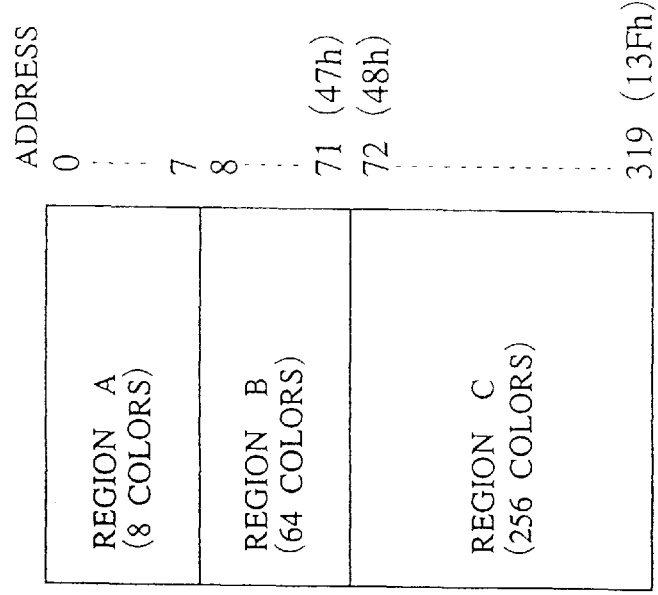

FIG. 1A is a memory map of a color RAM which holds color information. FIG. 1B is a data format of image data for access to a Region A of the color RAM. FIG. 1C is a data format of image data for access to Region B of the color RAM. FIG. 1D is a data format of image data for access to Region C of the color RAM.

The data formats of image data used in the data compressing method according to the present embodiment include: address fields, Code A, Code B, Code C, which hold addresses of the color RAM for holding color information; a run length field RL which holds a number of successive repetitions of color data in an image; and a cell field which is indicating whether or not all pixels of a processing unit (cell=16×16 pixels) for writing have the same color. The address fields, Code A, Code B, Code C, contain classification fields which hold category classification information obtained when the color RAM is classified into a required category.

As shown in FIG. 1A, the color RAM is divided into three regions, Region A (8 colors), Region B (64 colors), Region C (256 colors) in the order of frequency of use. The color RAM holds in total color information of 328 colors. Color information having the highest frequency of use and the highest possibility of successive repetition on an image are stored in Region A. Color information having a relatively high frequency of use and a relatively high possibility of successive repetition on the image data stored in Region B. Color information having low frequency of use are stored in Region C.

FIG. 1B shows a data format of image data which accesses Region A of the color RAM. This image data comprises a 4-bit address field, Code A, a 5-bit run length field RL, and a 1-bit cell field Cell. One upper bit of the 4-bit address field, Code A, is used commonly by a classification field.

The image data of FIG. 1B indicates that color information of Region A of the color RAM designated by the address field Code A is successively repeated by a number of pixels designated by the run length field RL. Thus., one color information stored in Region A can be represented by one image data over 32 successive pixels.

By using the cell field Cell of the image data of FIG. 1B, even when the whole one cell has the same color, the color can be represented by one image data.

FIG. 1C shows a data format of image data which accesses Region B of the color RAM. This image data comprises an 8-bit address field, Code B, and a 2-bit run length field RL. The upper 2 bits of the address field Code B are commonly used by a classification field.

The image data of FIG. 1C indicates that color information in Region B of the color RAM are successively repeated over a number of pixels designated by the run length field RL. Thus, one color in Region B can be represented by one image data over 4 successive pixels.

FIG. 1D shows a data format of image data which accesses Region C of the color RAM. This image data comprises a 10-bit address field, Code C. The upper two bits of the address field, Code C are used commonly by a classification field.

The image data of FIG. 1D indicates that color information in Region C of the color RAM designated by the address field Code C is designated for 1 pixel. The image data of FIG. 1D without the run length field can only represent one image data on 1 pixel. Colors in Region C of the color RAM have such low frequency of use and low frequency of successive occurrence that an overall compression ratio is not affected.

By means of an example shown in FIGS. 2A to 2C, a bitmap of object data used in the data compressing method according to the present embodiment, and relationships between the object data and the color RAM, will be explained. FIG. 2A shows the bitmap of the object data.

FIG. 2B shows a memory map of an object data memory. FIG. 2C is a memory map of the color RAM.

The object data of respective colors A–H each successively repeated over 8 pixels as shown in FIG. 2A can be represented by the compressed data r0–r7 of FIG. 2B. This example is based on the respective colors A–H belonging to Region A of the color RAM.

The compressed data r0–r7 comprise address information of the color RAM and run length information of the respective colors.

That is, the compressed data r0 indicates that a color A stored in an address 0 of the color RAM is successively repeated over 8 pixels. The compressed data r1 indicates that a color B stored in an address 1 is successively repeated over 8 pixels. The compressed data r2 indicates that a color C stored in an address 2 of the color RAM is successively repeated over 8 pixels. The compressed data r3 indicates that a color D stored in an address 3 of the color RAM is successively repeated over 8 pixels. The compressed data r4 indicates that a color E stored in an address 4 is successively repeated over 8 pixels. The compressed data r5 indicates that a color F stored in an address 5 of the color RAM is successively repeated over 8 pixels. The compressed data r6 indicates that a color G is successively repeated over 8 pixels. The compressed data r7 indicates that a color H stored in an address 7 of the color RAM is successively repeated over 8 pixels.

Based on the compressed data r0–r7 held by the object data memory, access is made successively 8 times to RGB data of the colors A–H of the color RAM to expand the object data of FIG. 2B into the bitmap of FIG. 2A. As a result, the object data can be represented by a memory capacity which is ⅛ that of the conventional method.

As described above, according to the present embodiment, the classification field and the address fields Code A, Code B, Code C are commonly used, and the run length field RL and cell field Cell are provided for frequently used colors, so that image data containing color data can be efficiently compressed.

Then, image data expanding device according to one embodiment of the present invention will be explained with reference to FIGS. 3 to 11. The image data expanding device is for expanding image data compressed by the above-described data compressing method into a bitmap.

Figure 3:
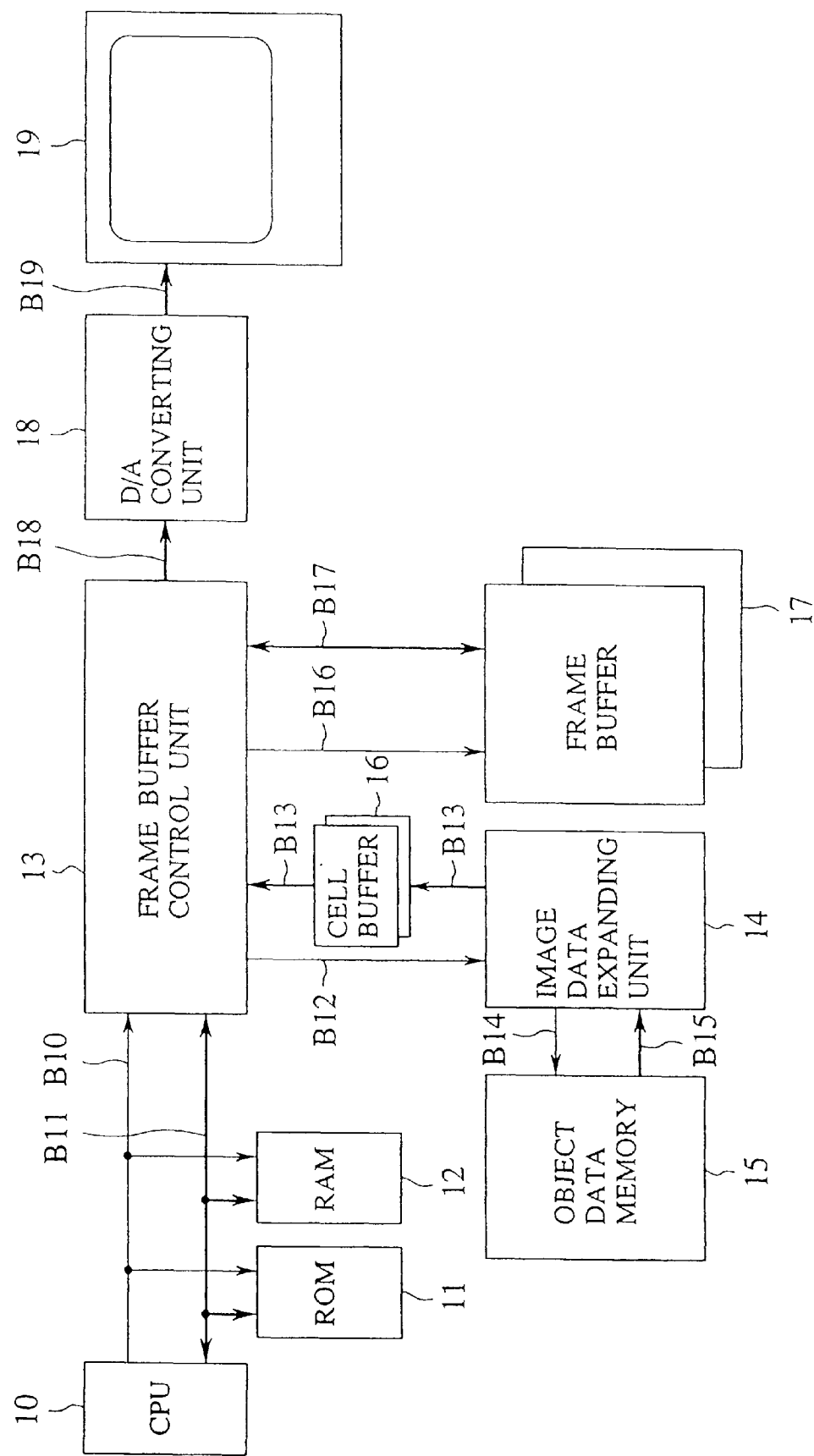
FIG. 3 is a block diagram of the image processing system according to one embodiment of the present invention.

With reference to FIG. 3, the image processing system including the image data expanding device according to the present embodiment will be briefed in connection with its general structure.

A CPU 10 is a processing unit which controls the processing of the image processing system according to the present embodiment. A ROM 11 and a RAM 12 used in this system are connected to the CPU 10 by a CPU address bus B10 and a CPU data bus B11. The ROM 11 stores a processing program for this image processing system. The RAM 12 temporarily stores data, etc. as required.

The CPU address bus B10 and the CPU data bus B11 are connected to a frame buffer control unit 13. The frame buffer control unit 13 outputs a command for object data to the image data expanding unit 14 in response to a command of the CPU 10, and receives RGB data corresponding to the command from the image data expanding unit 14 and writes the RGB data in the frame buffer 17.

The frame buffer control unit 13 is connected to an image data expanding unit 14 by an object parameter transfer bus B12 and an RGB data transfer bus B13. The image data expanding unit 14 is connected to an object data memory 15 by an address bus B14 and a data bus B15.

Compressed object data are stored in the object data memory 15. The image data expanding unit 14 expands object data stored in the object data memory 15 in response to a command from the frame buffer control unit 13, and writes RGB data in the cell buffer 16. The frame buffer control unit 13 reads RGB data for one cell from the cell buffer 16 and writes the RGB data in a required position of the frame buffer 17.

The cell buffer 16 is a memory which stores image data for one cell. Cell buffers 16 are provided for two cells. While RGB data from the frame buffer control unit 13 are being written in one of the cell buffers 16, RGB data for one cell are being read from the other cell buffer 16.

The frame buffer control unit 13 is connected to a frame buffer 17 by an address bus B16 and a data bus B17. The frame buffer control unit 13 writes in a required position of the frame buffer 17 RGB data for one cell read from the cell buffer 16.

The frame buffer control unit 13 is connected to a D/A (digital/analog) conversion unit 18 by an RGB data bus B18. The D/A conversion unit 18 is connected to a display 19 by an analog RGB data bus B19. The frame buffer control unit 13 reads image data for one frame from the frame buffer 17 and supplies the image data to the display 19 through the D/A conversion unit 18.

The frame buffer 17 is a memory which stores image data for one screen. Frame buffers 17 are provided for two screens. While image data are being read from one of the frame buffers 17 and are being displayed on the display 19, image data for a next screen are being written in the other frame buffer 17 by the frame buffer control unit 13.

The D/A conversion unit 18 converts RGB data read from the frame buffer 17 into analog RGB data and displays the analog RGB data on the display 19. The display 19 displays the analog RGB data.

Figures 4A, 4B, 5:
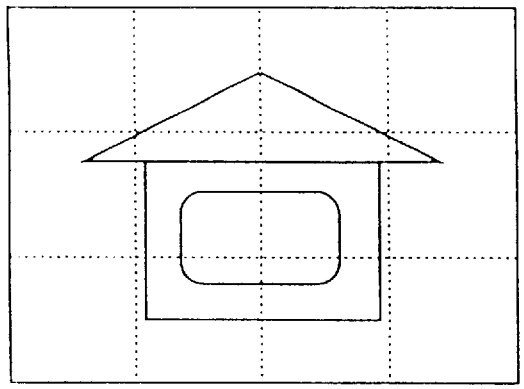
FIGS. 4A to 4B are views of an example of an object data.
FIG. 5 is a view of an example of object parameters.

An example of the object data is shown in FIG. 4A.

This object data has a size having a 48 bit length and a 64 bit width. The object data is divided into 16 bit-length×16 bit-width regions. Each region is called a cell. To discriminate cells of the object data from one another, the cells are numbered as shown in FIG. 4B.

Examples of object parameters are shown in FIG. 5. The object parameters are parameters for expanding object data. The image data expanding unit 14 expands object data stored in the object data memory 15 in response to commands according to the parameters.

An object parameter P1 represents color numbers and designates color numbers.

An object parameter P2 represents an object address and designates a storage address in the object data memory 15.

An object parameter P3 includes four parameter, OT, RF, VF, and RF. The parameter OT indicates whether or not an object is made semi-transparent. The parameter RF indicates whether or not an object is rotated by 90°. The parameter VF indicates whether or not an object is vertically reversed. The parameter HF indicates whether or not an object is horizontally reversed.

The object parameter P4 includes two parameters V-Cell, H-Cell. The parameter V-Cell indicates a number of cells in the vertical direction of an object. The parameter H-Cell indicates a number of cells in the horizontal direction of an object.

An object parameter P5 includes two parameters V-Zoom Center, H-Zoom Center. The parameters V-Zoom Center, H-Zoom Center indicate central positions for enlargement and diminution.

An object parameter P6 includes two parameters V-Zoom Ratio, H-Zoom Ratio. The parameter V-Zoom Ratio, h-Zoom Ratio indicate enlargement and diminution ratios for enlargement and diminution.

An object parameter P7 includes two parameters Disp. V-Pos, Disp. H-Pos. The object parameter P7 indicates where an object is positioned in the frame buffer 17.

Figure 6:
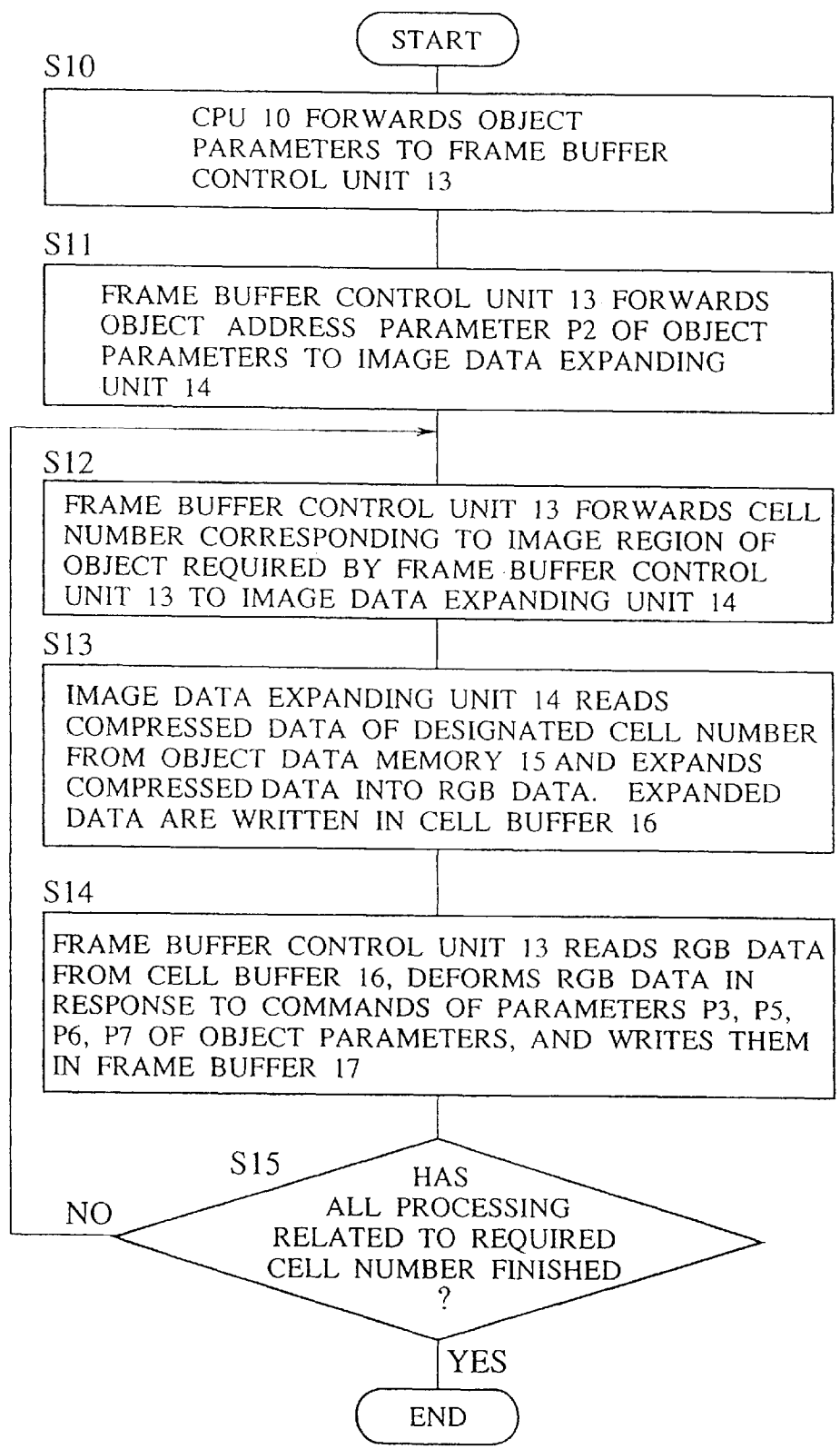
FIG. 6 is a flow chart of the operation of the image processing system according to one embodiment of the present invention.

Then the operation of the image processing system including the image data expanding device according to the present embodiment will be explained with reference to the flow chart of FIG. 6.

First, the CPU 10 forwards the object parameters of FIG. 5 to the frame buffer control unit 13 (Step S10).

Then, the frame buffer control unit 13 forwards an object address parameter P2 of the object parameters to the image data expanding unit 14 (Step S11). An object to be expanded is designated. Image data of this object is expanded in the frame buffer 17.

First, the frame buffer control unit 13 forwards a cell number corresponding to an image region of an object required by the frame buffer control unit 13 to the image data expanding unit 14 (Step S12). A cell to be expanded is designated.

Next, the image data expansion unit 14 reads compressed data of the designated cell number from the object data memory 15 and expands the compressed data into RGB data. The expanded data are written in the cell buffer 16 (Step S13).

Then, the frame buffer control unit 13 reads the RGB data from the cell buffer 16, deforms the RGB data in response to commands of the parameters P3, P5, P6, P7 of the object parameters, and writes them in the frame buffer 17 (Step S14).

Next, it is judged whether or not all processing related to the cell number required by the frame buffer control unit 13 is finished (Step S15). When all the processing is not over, Step S12 is repeated. When all the processing is over, the data expansion processing is ended.

Next, the image data expanding device according to the present embodiment will be detailed with reference to FIGS. 7 to 10.

Figure 7:
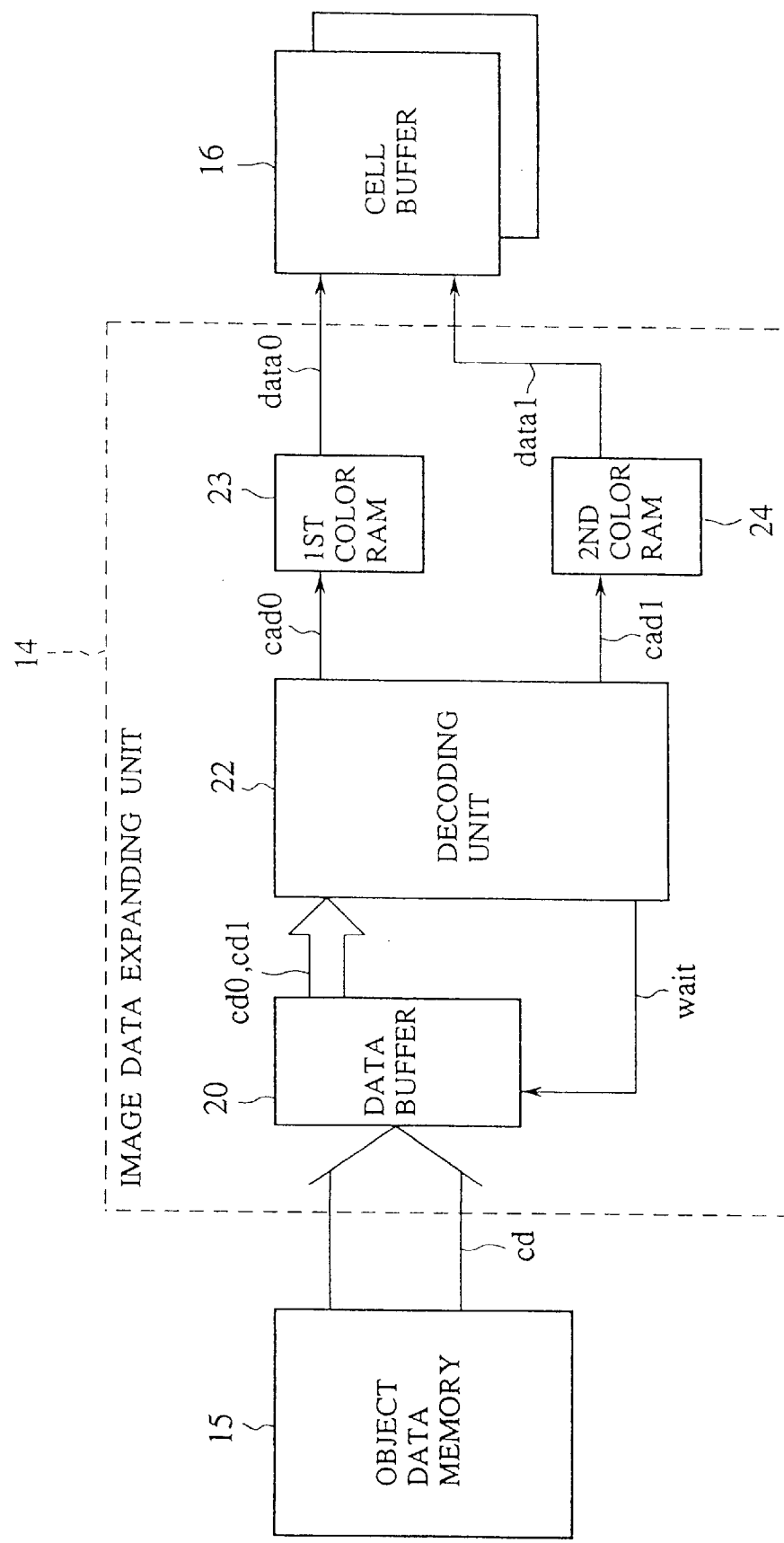
FIG. 7 is a block diagram showing details of the image data expanding unit according to one embodiment of the present invention.

FIG. 7 shows a block diagram of an image data expanding unit 14 of the image data expanding device. The image data expanding unit 14 comprises a data buffer 20 which holds object data from an object data memory 15, a decoding unit 22 which decodes the object data, and a first color RAM 23 and a second color RAM 24 which store color information. A bitmap of a cell expanded by the image data expanding unit 14 is written in the cell buffer 16.

As shown in FIG. 2B, the object data memory 15 holds compressed data r0–r7. As shown in FIG. 1A, the first color RAM 23 and the second color RAM 24 hold color information of 328 colors in the order of frequency of use.

Figure 8:
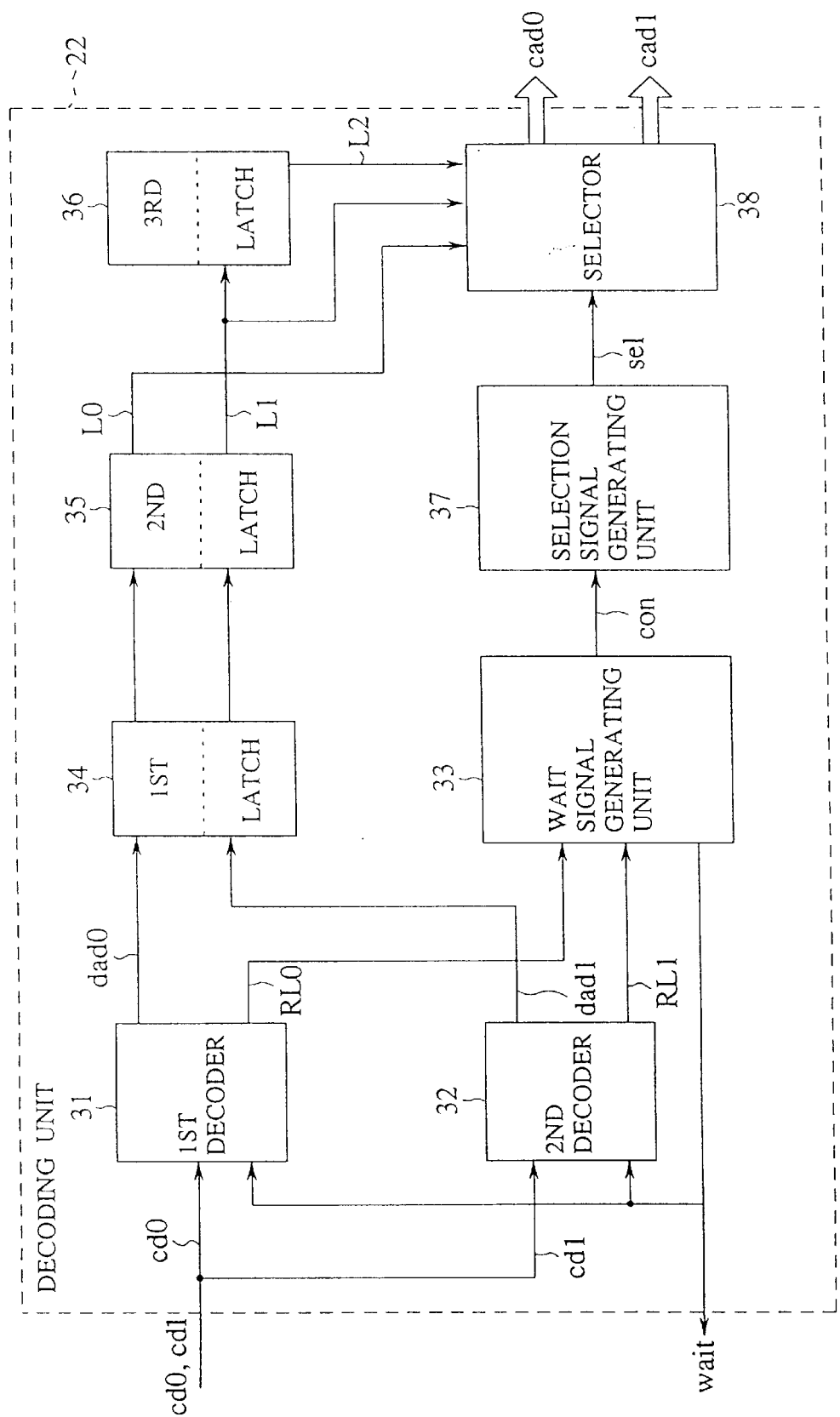
FIG. 8 is a block diagram showing details of the decoding unit of the image data expanding unit of FIG. 7.

FIG. 8 is a detailed block diagram of the decoding unit 22 of the image data expanding unit 14. The decoding unit 22 includes: a first decoder 31 and a second decoder 32 which decode classification fields of the compressed data and generate addresses, based on the address fields Code A, Code B, Code C determined in accordance with decoded results; and address supply means 33, 34, 35, 36, 38 which supply the generated addresses a number of times corresponding to a number of successive repetitions in the run length field RL to access the color RAMs 23, 24.

As shown in FIGS. 7 and 8, the image data expanding device according to the present embodiment includes one pair of parallel sets each including the color RAM, the decoder and address supply means. The address supply means store a sequence of compressed image data to be supplied to the first decoder 31 and the second decoder 32 to supply addresses for access to the first and the second color RAMs 23, 24.

As shown in FIG. 8, the address supply means includes a wait signal generating unit 33, a first latch 34 for holding two 10-bit data, a selection signal generating unit 37, a second latch 35 for holding two 10-bit data, a third latch 36 for holding one 10-bit data, and a selector 38.

The data expanding device according to the present embodiment has the following processing stages (1)–(3) which are operated by pipeline control with synchronization by clocks.

(1) The data expanding device receives two compressed data at the data buffer 20, and addresses dad0, dad1 are generated by the first and the second decoders 31, 32 and are latched by the first latch 34.

(2) A wait signal wait and a control signal con are generated, based on run length information RL0, RL1 from the first and the second decoders 31, 32 while the contents of the first latch 34 is latched to the second latch 35.

(3) A selection signal sel is generated based on the control signal con while one of the 10-bit data of the second latch 35 is latched to the third latch 36. Two data of the two data of the second latch 35 and the data of the third latch 36 are selected based on the selection signal sel, and, based on the two data as addresses cad0, cad1, access is made to the first and the second color RAMs 23, 24, and a bitmap is expanded in the cell buffer 16.

Then, the operation of the decoding unit 22 will be detailed.

First, the first decoder 31 and the second decoder 32 receive two compressed data from the data buffer 20, and output addresses dad0, dad1, and run length information RL0, RL1.

Figure 9A:
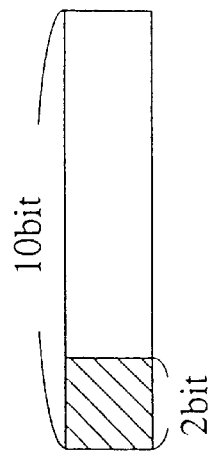
FIGS. 9A to 9D are views explaining the operation of the decoding unit of FIG. 8, FIG. 9A being a view explaining the classification field, FIG. 9B being a view explaining decoding of data for access to Region A, FIG. 9C being a view explaining decoding of data for access to Region C.
Figure 9B:
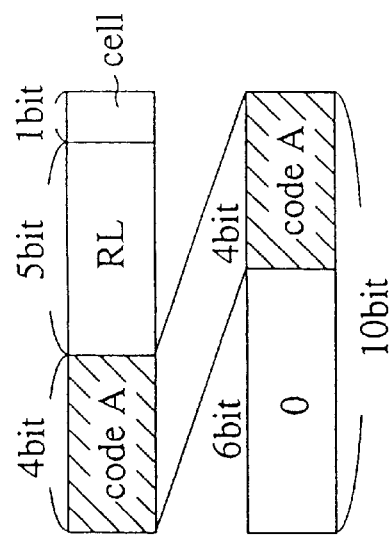

As shown in FIG. 9A, a classification field of the upper two bits of each compressed data is decoded. When the field is [00] or [01], the image data is judged to have a data format for access to Region A, and is outputted as an address data of 10 bits, as shown in FIG. 9B, the lower 4 bits of which are for Code A and upper 6 bits of which are [0]. Five-bit data of the run length field RL is separated as it is to be outputted as run length information.

Figure 9C:
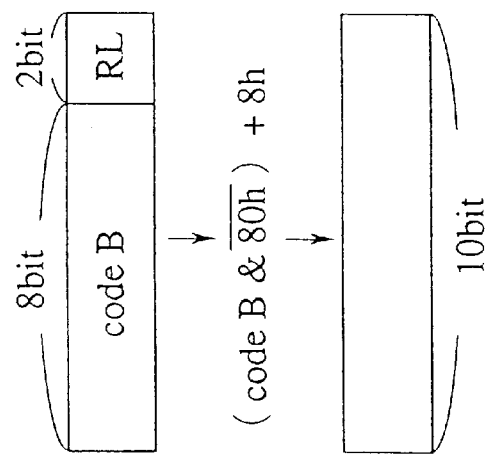

When a classification field is [10], the image data is judged to have a data format for access to Region B, and is outputted as an address data of 10 bits, as shown in FIG. 9C, for a conjunction of Code B (8 bits) and 80h negation (7Fh), and an off set value [8h]. 2-bit data of Run length field RL is separated as it is and outputted as run length information.

Figure 9D:
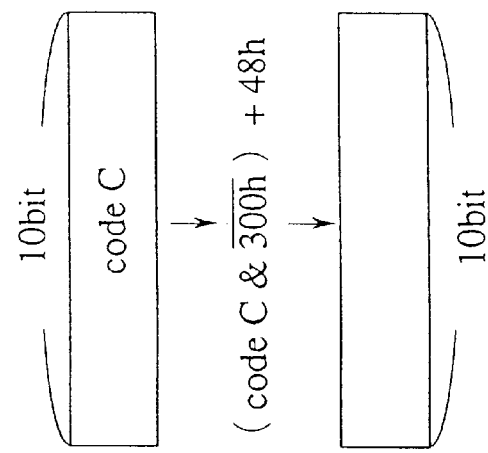
Figures 12A, 12B, 12C:
FIGS. 12A to 12C are explanatory views of a conventional data compressing method, FIG. 12A being a bitmap of the object data, FIG. 12B being a memory map of the object data memory, FIG. 12C being a memory map of the color RAM.

When a classification field is [11], the image data is judged to have a data format for access to Region C, and is outputted as an address data of 10 bits, as shown in FIG. 9D, for a conjunction of Code C (10 bits) and 300h negation (0FFh), and an off set value [48h]. [0] is outputted as run length information.

The thus generated addresses dad0, dad1 are latched by the first latch 34, and the run length information RL0, RL1 are supplied to the wait signal generating unit 33.

Then, the wait signal generating unit 33 generates a wait signal wait and a control signal con, based the run length information RL0, RL1 from the first and the second decoders 31, 32. At this time, the content of the first latch 34 is latched by the second latch 35.

When the run length of the received compressed data is not [0], a wait signal wait is outputted until the expansion is over to pause the processing of the data buffer 20, the first decoder 31 and the second decoder 32, because, if new compressed data is inputted by a next clock to the first and the second decoders 31, 32, run length information can not be expanded.

Based on run length information RL0, RL1, a control signal con which determines what combination of addresses of the two color RAMs are generated. A control signal con contains a signal indicating which of the current address signals dad0, dad1 is being expanded, and a signal indicating whether or not some of the data at the address dad1 for the previously received compressed data is left not outputted.

In the present embodiment, two addresses are outputted for each color RAM 23, 24. When the run length of the previously received compressed data is [2], outputted addresses are repeated for three times, and after the addresses for two times have been outputted, the address for one time is left. This address for one time has to be outputted together with addresses of next received compressed signals.

Then the selection signal generating unit 37 generates a selection signal sel, based on the control signal con. At this time one of the 10-bit data (address data dad1) of the second latch 35 is latched to the third latch 36. The selector 38 selects, based on the selection signal sel, two data of the second latch 35, and two of the data of the third latch 36 to output them as addresses cad0, cad1.

Combinations of address data selected by the selector 38 are shown in FIG. 10 In the first selection, as a color RAM address cad0, address data dad1 (output L2 of the third latch 36) generated based on the previous compressed data is outputted, and address data dad0 (an output L0 of the second latch 35) is outputted as a color RAM address cad1.

In the second selection, address data dad0 (an output L0 of the second latch 35) is outputted as a color RAM address cad0, and address data dad0 (an output L0 of the second latch 35) is outputted as a color RAM address cad1.

In the third selection, address data dad0 (an output L0 of the second latch 35) is outputted as a color RAM address cad0, and address data dad1 (an output L1 of the second latch 35) is outputted as a color RAM address cad1.

Then, an example of the operation of the present embodiment will be explained with reference to FIG. 11A to 11C.

FIG. 11A shows relationships between compressed data inputted to the decoding unit 22 and color RAM addresses outputted from the decoding unit 22. FIG. 11 shows color RAM addresses inputted to the color RAMs 23, 24 and pixel data outputted from the color RAMs 23, 24. FIG. 11C shows bitmap expanding to the cell buffer 16. In the drawings, code0–code7 are compressed data, A0–A7 are color RAM addresses; and P0–P7 are pixel display data.

In this example, the compressed data code0 has a run length of 4; the compressed data code1 has a run length of 3; the compressed data code 2 has a run length of 0; the compressed data code 3 has a run length of 0; the compressed data code 4 has a run length of 2; the compressed data code 5 has a run length of 0; the compressed data code 6 has a run length of 7; and the compressed data code 7 has run length of 1.

As shown in FIG. 11A, the compressed data (code 0, code 1, code 2, . . .) are decoded into color RAM addresses (A0, A0, A0, A0, A0, A1, A1, . . .) by the decoding unit 22.

As shown in FIG. 11B, when the color RAMs 23, 24 are accessed at the decoded color RAM addresses (A0, A0, A0, A0, A0, A1, A1, . . .), the color RAMS 23, 24 output color information (P0, P0, P0, P0, P0, P1, P1, . . . ).

As shown in FIG. 11C, the color information (P0, P0, P0, P0, P0, P1, P1, . . . ) outputted by the color RAMs 23, 24 are expanded by two pixels on the cell buffer 16.

Thus, in the data expanding device according to the present embodiment, two sets of the color RAM, the decode and the address supply means are provided in parallel, and the respective elements are pipeline controlled, whereby compressed image data can be expanded quickly into a bitmap.

The present invention is not limited to the above-described embodiment, and includes other variations and modifications.

For example, in the above-described embodiment, the color RAM are divided into three regions, but may be divided into any number of regions as long as the regions are two or more.

The format of the compressed data is not limited to the example of the above-described embodiment as long as it has address fields, classification fields and run length fields.

The constitution of the decoding unit is not limited to the above-described one as long it decodes compressed data and outputs addresses of a color RAM.

INDUSTRIAL APPLICABILITY

The present invention is suitable for a data compressing method for efficiently compressing image data containing color data. The present invention is suitable for a compressed data expanding method and system for quickly expanding compressed data into bitmaps. The present invention is effective to be used especially in image processing systems of game apparatuses using color image data.

What is claimed is:

1. A data compressing method for compressing image data containing color data, the image data being compressed into image data including: address fields which hold addresses of color information storage means holding color information, the address corresponding to the color data; classification fields which, when the color information storage means are classified in prescribed categories, hold classification information of the category in which the color data are included; and run length fields which hold numbers of successive repetitions of color data, the run length fields having a decreased bit number when the address fields have a large bit number, so that the image data have a fixed length.

2. A data compressing method according to claim 1, wherein the categories in which the color information storage means are classified are determined in accordance with frequencies of use of the color information.

3. A data compressing method according to claim 1 or 2, wherein the image data further includes cell fields which indicate whether or not all pixels of a cell which is a processing unit for writing have the same color.

4. An image data memory in which image data containing color data are stored, the image data memory comprising: address regions which hold addresses of color information storage means holding color information, the address corresponding to the color data; classification regions which, when the color information storage means are classified in prescribed categories, hold classification information of the categories in which the color data is included; and run length regions which hold numbers of successive repetitions of color data, a total of a bit number of the address regions and a bit number of the run length regions being a prescribed bit number so that the image data has a fixed length.

5. An image data memory according to claim 4, further comprising cell regions which indicate whether or not all pixels of a cell which is a processing unit for writing have the same color.

6. An image data memory in which image data containing color data are stored, the image data memory comprising: address fields which hold addresses of color information storage means holding color information; category regions which, when the color information storage means are classified in prescribed categories, hold classification information of the categories in which the color data are included; and run length regions which hold numbers of successive repetitions of color data, a total of a bit number of the address regions and a bit number of the run length regions being a prescribed bit number so that the image data has a fixed length.

7. A method for expanding compressed data including address fields which hold addresses of color information storage means holding color information, the address corresponding to the color data, classification fields which hold category information of the color information storage means including the color data, and run length fields which hold numbers of successively repeated ones of the color data, the method comprising:

a first processing of decoding the classification fields to determine categories in which the color data are included, and, based on the determined categories, decoding the address fields to generate addresses; and a second processing of repeatedly supplying the generated addresses by the numbers of successive repetitions of color data in the run length fields.

8. A method for expanding compressed data according to claim 7, wherein the first processing and the second processing are performed in parallel as individual stages to be pipeline controlled.

9. A device for expanding compressed data including address fields which hold addresses of color information storage means holding color information, which (address) correspond to the color data, classification fields which hold category information of the color information storage means including the color data, and run length fields which hold numbers of successive repetitions of color data, the device comprising:

decoding means which decodes the classification fields to determine categories in which the color data are included, and, based on the determined categories, decodes the address fields to generate addresses; and address supply means which repeatedly supplies the addresses generated by the decoding means by the numbers of successive repetition of the color data in the run length fields to access the color information storage means.

10. A device for expanding compressed data according to claim 9, wherein two or more sets of the color information storage means, the decoding means and the address supplying means are provided, the first processing by the decoding means, and the second processing by the address supply means are performed in parallel as individual stages to be pipeline controlled.

11. An image data processing device comprising:

color information storage means which classify color information in prescribed categories and hold the same;

an image data memory including address regions which hold addresses of the color information storage means corresponding to the color data, classification information regions which hold category information of the color information storage means including the color data, and run length regions which hold numbers of successive repetitions of color data, the image data containing the color data being stored compressed;

decoding means which decodes the classification fields to determine the categories in which the color data are included, and, based on the determined categories, decodes the address fields to generate addresses;

address supply means which repeatedly supplies the generated addresses by the decoding means by the numbers of successive repetitions of color data in the run length fields to access the color information storage means;

storage means which sequentially stores the image data containing the color data read from the color information storage means by the address supply means; and display means which displays the expanded image data by the storage means.

* * * * *